United States Patent [19]

Thomas

[11] Patent Number: 5,895,676
[45] Date of Patent: Apr. 20, 1999

[54] BINDING AGENT DISPERSIBLE IN HOT WATER

[75] Inventor: Rémi Thomas, Berneuil en Bray, France

[73] Assignee: Nestec S.A., Vevey, Switzerland

[21] Appl. No.: 08/776,235

[22] PCT Filed: Jul. 17, 1995

[86] PCT No.: PCT/EP95/02822

§ 371 Date: Jan. 10, 1997

§ 102(e) Date: Jan. 10, 1997

[87] PCT Pub. No.: WO96/03893

PCT Pub. Date: Feb. 15, 1996

[30] Foreign Application Priority Data

Jul. 20, 1994 [AT] Austria ................................ 94111833

[51] Int. Cl.⁶ ........................................ A23B 9/14
[52] U.S. Cl. ................ 426/99; 426/96; 426/98; 426/293; 426/302; 426/312; 426/549; 426/589
[58] Field of Search .................... 426/93, 96, 98, 426/99, 293, 302, 312, 549, 555, 589

[56] References Cited

U.S. PATENT DOCUMENTS

| 4,021,582 | 5/1977 | Hsu ............................................. 426/99 |
| 4,126,710 | 11/1978 | Jaworski et al. ........................ 426/589 |
| 4,363,824 | 12/1982 | Willi et al. ............................. 426/589 |
| 4,568,551 | 2/1986 | Seewi et al. ............................ 426/99 |

FOREIGN PATENT DOCUMENTS

| 1463081 | 3/1967 | France . |
| 1516055 | 6/1968 | France . |
| 2230303 | 12/1974 | France . |
| 1478843 | 7/1977 | United Kingdom . |

*Primary Examiner*—Lien Tran
*Attorney, Agent, or Firm*—Pennie & Edmonds LLP

[57] ABSTRACT

A process for producing a roux-like binding agent for foodstuffs. Fine particles of farinaceous material are transported into an enclosed particle coating zone where a molten, high-melting point fat is sprayed, in the form of fine droplets, onto the particles to coat them. At the same time, the coated particles are cooled to a temperature below the melting point of the fat using chilled gas. The coated particles are flowable and disperse readily in hot water.

8 Claims, 1 Drawing Sheet

5,895,676

BINDING AGENT DISPERSIBLE IN HOT WATER

This invention relates to a binding agent for foodstuffs which is dispersible in hot water. The invention also relates to a process for production of the binding agent.

BACKGROUND ART

Binding agents or, as they are sometimes known, thickeners form the base of many dried food products such as sauces, soups and gravies. These dried food products usually contain other ingredients such as dried vegetables, meat extracts, yeast extracts, sugars, salt, fats, oils and the like but it is the binding agent that usually gives the food, once re-hydrated, its consistency and creamy sensory appeal. The idea is for the binding agent to simulate the roux used in traditional cooking.

Like roux, the binding agents are usually prepared from a starch material and a fat. The starch material is usually in the form of a flour of some sort; particularly wheat flour although other flours are used. Now-a-days the fat is usually a hardened vegetable fat. The starch material and the fat are combined, often dehydrated, and then added to the remaining ingredients of the dried food product. However, severe problems have arisen in providing a binding agent which, when hot water is stirred into the dried food product, does not result in lumping or clumping. If the product is intended as an "instant food", it is important that the dried food product re-hydrate rapidly upon the addition of hot water without lumping or clumping.

The problem was addressed in U.S. Pat. No. 4,363,824. This patent describes a process in which a high melting point fat is first heated to above its melting point (for example to 70° C.). A flour is then mixed in to provide a dough containing about 55% to 80% flour. The dough is then transported to a cooling tank where it is allowed to cool under controlled conditions. In particular, the dough undergoes cooling so that a constant temperature decrease occurs at least while the dough is at a temperature between 35° C. and 15° C. Cooling in this manner causes the fats to undergo crystal structure modifications and results in a product which contains less than 50% liquid fat when at a temperature of 20 to 35° C. The cooled dough is then run through a cooling roller to form it into a thin sheet. The dough is then scraped off in the form of flakes. The flakes are then added to dried foodstuffs as the binding agent. The binding agents produced by this process provide the dried foodstuffs with good re-hydration properties. However, the binding agents contain relatively high amounts of fatty material in order for them to be processed through the cooling roller. In certain cases, for example if the binding agent is to be used for low fat products, this may be disadvantageous.

Another approach is described in U.S. Pat. No. 4,568,551. This patent describes a process in which a high melting point fat is heated to melt it and the melt is then mixed with a starch material, particularly wheat flour, to form a homogeneous dough. A small amount of water is then mixed in. The dough is then heated to a temperature above 90° C. and maintained at the elevated temperature, under continuous mixing, until the moisture content reduces to below 7%. The dough is then cooled to room temperature and ground up to form a free-flowing, dehydrated, binding agent. The binding agent is described to disperse readily in boiling water without the formation of lumps. The disadvantage of this process is that it requires heating to above 90° C., in many cases for long periods. This makes the process expensive.

Yet another process is described in British patent 1478843. In the process described in this patent, an agglomerated starch is coated with an edible fat of high melting point in a planetary mixer or bowl chopper. The process has the advantage of being simple and no heating or cooling is required. Also the fat content of the binding agent may be low; for example about 20% by weight. However the binding agent is not made up of well formed particles and the flowability of the binding agent is low.

Therefore there is a need for a binding agent for foodstuffs which is flowable, readily dispersible in water, which may contain relatively low amounts of fatty materials, and which may be produced by a process not requiring the use of high temperatures.

SUMMARY OF THE INVENTION

Accordingly, in one aspect, this invention provides a process for producing a binding agent for foodstuffs, the process comprising:

introducing chilled gas at a temperature below 10° C. upwardly into an enclosed particle coating zone to chill particles of farinaceous material transported in the enclosed particle coating zone, the particles of farinaceous material having a size less than 500 µm;

spraying a molten, edible fat of melting point above 35° C. into the particle coating zone in the form of droplets of size less than about 80 µm to coat the particles of farinaceous material and provide coated particles comprising about 60% to about 85% by weight of farinaceous material and about 40% to about 15% by weight of edible fat, the chilled gas cooling the edible fat which coats the coated particles to a temperature below the melting point of the edible fat; and collecting the coated particles.

The process surprisingly produces a binding agent which is readily dispersible in hot water without clumping and which provides excellent texture and consistency. For example, in tests the binding agent dissolved within 20 seconds in hot water. Further, the binding agent may have a low fat content; for example as low as 15% by weight. Also, the coated particles of the binding agent are substantially spherical and flowable. Consequently, an excellent binding agent for powdered, dry foodstuffs is provided.

The amount of fat sprayed into the particle coating zone is preferably sufficient so that the coated particles contain about 20% to about 40% by weight of fat and about 80% to about 60% by weight of farinaceous material. The farinaceous material preferably contains at least 50% by weight of a flour; particularly a wheat flour. However, other flours may be used and examples are rice flour, cassava flour, tapioca flour and the like. Also, agglomerated starches such as potato starch, maize starch, wheat starch and the like may be used in combination with the flour.

Preferably, the particles of farinaceous material have a particle size of less than 300 µm. It is especially preferred if less than 25% by weight of the particles of farinaceous material have a particle size less than about 50 µm and less than 5% by weight have a particle size greater than about 200 µm. It is also preferred if the distribution of particles sizes is relatively small; for example at least 60% by mass of the particles having a particle size within about 60 µm of the mean particle size. Preferably about 70% by mass of the particles have a particle size in the range of about 80 µm to about 150 µm. The mean particle size is preferably about 100 µm.

The edible fat preferably has a melting point in the range of 35° C. to 50° C. It is particularly preferred for the melting point of the edible fat to be in the range of 40° C. to 45° C.

The molten fat sprayed into the particle coating zone preferably has droplet sizes of about 5 µm to about 80 µm. More preferably, the droplet sizes are about 5 µm to about 40 µm.

Prior to being sprayed into particle coating zone, the edible fat is heated to above its melting point. Preferably, the fat is heated to a temperature no more than 10 to 20° C. above its melting point. For example, a fat which has a melting point in the range of 40° C. to 45° C. may be heated to about 55 to 60° C.

The coated particles are preferably cooled to a temperature at least 20° C. below the melting point of the fat. For example, the coated particles may be cooled to a temperature of less than about 15° C., preferably between about 0° C. and about 10° C.

In one embodiment, the particles of farinaceous material fall through the particle coating zone against the flow of the chilled gas. Then the molten fat may be sprayed into, and towards the centre of, the stream of falling particles of farinaceous material. Preferably, the spray is directed substantially perpendicular to the stream of particles of farinaceous material.

In this embodiment, the flow rate of the chilled gas is preferably insufficient to completely fluidize the coated particles and prevent them from falling from the particle coating zone. However, the flow rate of the chilled gas is preferably selected so that the residence time of the particles in the particle coating zone is less than about 5 minutes; more preferably less than 2 minutes, for example about 1 minute. Too long a residence time in the coating zone will result in particles which carry large quantities of fat. Also the particle size of the coated particles will become too large. On the other hand, too short a residence time in the coating zone will result in the coated particles carrying too little fat to give the desired consistency in the food product ultimately produced. Also, too little chilled gas will not give the required cooling. However, the flow rate of the chilled gas may be adjusted as desired to give a desired coating to the particles. The flow rate of chilled gas required will depend upon numerous parameters such as the temperature of the chilled gas, the temperature of the molten fat, the flow rate of the coated particles, the cross-sectional area for flow, the particle size, and the like. However, a suitable flow rate is readily determined by the person skilled in the art.

In another embodiment, the particles of farinaceous material may be fluidized by the chilled air. This embodiment is particularly suited to a batch process. Preferably, the molten fat is sprayed into the bed of fluidized particles over a time of 20 minutes or less; for example about 15 minutes. Upon completion of spraying of the molten fat, the particles may be fluidized for a further period to further chill the coated particles.

Preferably, the coated particles have a particle size in the range of 100 µm to about 700 µm, for example about 200 µm to about 500 µm.

The chilled gas is preferably air since this will usually be the least expensive gas; but any suitable gas may be used such as carbon dioxide and nitrogen. The air is preferably chilled to a temperature less than about 10° C., for example between −20° C. and about 6° C., prior to introduction into the particle coating zone.

Upon removal from the coating zone, the coated particles may be stored at a temperature between 0° C. and 15° C. to permit the fat in the coating to convert to the γ crystalline form. It is usually found that the fat which initially solidifies on the particles, does so in the unstable α crystalline. If the fat is stored at a temperature of less than about 15° C. for up to 72 hours, the crystalline form first converts to the β crystalline form and then the stable γ crystalline form.

In another aspect this invention provides a binding agent for foodstuffs produced by a process as defined above, the binding agent comprising coated particles each having a core of a farinaceous material and a coating of an edible fat; the coated particles having a particle size of about 200 µm to about 500 µm and being dispersible in hot water.

In another aspect this invention provides a flowable binding agent comprising substantially spherical particles each having a core of a farinaceous material and a coating of an edible fat, the edible fat comprising about 15% to about 40% by weight of the binding agent and the farinaceous material comprising about 85% to about 60% of the binding agent, and the coated particles having a size of about 200 µm to about 500 µm and being dispersible in hot water.

Preferably about 70% by weight of the farinaceous material making up the core of the coated particles has a particle size in the range of about 80 µm to about 150 µm. The mean particle size is preferably about 100 µm.

BRIEF DESCRIPTION OF THE DRAWING

Embodiments of the invention are now described, by way of example only, with reference to the FIGURE which is a schematic view of an apparatus in which the binding agent may be produced.

DETAILED DESCRIPTION OF THE PREFERRED EMBODIMENTS

Figure 1:
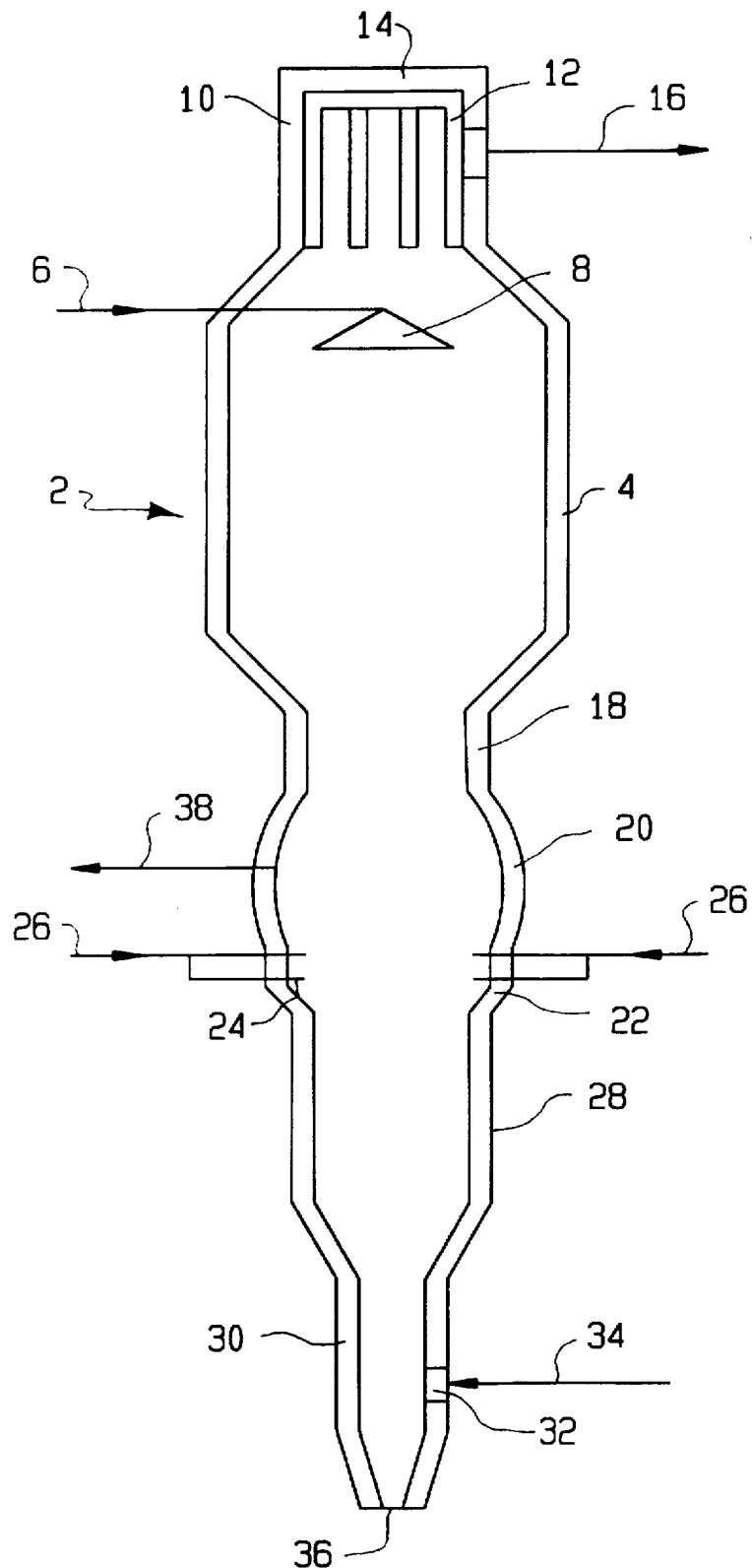

One example of the apparatus in which the binding agent may be produced is illustrated in FIG. 1. This apparatus is commercially available from the Babcock company and is commonly used for producing agglomerated cattle food. The apparatus consists of an elongate tubular tower 2 which is aligned vertically. The tower 2 has a substantially cylindrical upper portion 4 into the top of which a particle feed line 6 extends radially. The particle feed line 6 terminates at the axis of the upper portion 4 in a distributor 8. In use, the distributor 8 distributes particles evenly across the upper portion 4.

A substantially cylindrical filter portion 10 is positioned above the upper portion 4. The filter portion 10 is of smaller diameter than the upper portion 4 and terminates in an upper wall 14. A gas outlet line 16 exits from the filter portion 10. The filter portion further includes filter screens 12 to filter out particles which are entrained by gas leaving through the gas outlet line 16.

Below the upper portion 4, the tower 2 tapers down to a substantially cylindrical waist portion 18. The waist portion 18 terminates at its lower end in a bulged portion 20 which presents a convex outer surface and a concave inner surface before returning to a diameter at its lower ends substantially the same as at its upper end. A gas bleed line 38 runs from the bulged portion 20 and connects to the gas outlet line 16. The shape of the tower 2 in this area and the gas bleed line 38 enables the rate of fall or rise of particles in this portion of the tower 2 to be controlled.

A cylindrical injection portion 22 is positioned beneath the bulged portion 20. The injection portion 22 has a plurality of injection nozzles 24 projecting into it around its circumference. Each injection nozzle 24 points substantially towards the axis of the tower 2. Each injection nozzle has an aperture of size such that liquid fatty material flowing through it is atomised into droplets of size less than about 80 μm. The aperture size to achieve this will depend upon the viscosity, pressure and flow rate of the molten fat and can be readily determined for any given application. The injection nozzles 24 are each connected to a fat feed line 26. The fat feed lines 26 join and are in turn connected to a heated fat storage tank (not shown) in which the fat is maintained in a liquid state. A suitable fat feed pump (not shown) is connected in the fat feed lines 26 to pump the fat through the injection nozzles 24 at a pressure of between 20 to 150 bar (for example). A suitable fat feed pump is a high pressure volumetric piston pump such as supplied by Bran & Lubbe. However skilled process engineers would be able to readily select other suitable pumps from the many pumps which are commercially available.

Beneath the injection portion 22, the tower 2 tapers inwardly to a substantially cylindrical lower portion 28. Beneath the lower portion 28, the tower 2 tapers inwardly again to a substantially cylindrical gas feed portion 30. The gas feed portion 30 has a gas inlet 32 in its side to which is connected a gas inlet line 34.

The tower 2 at the lower end of the gas feed portion 30 tapers down to a small particle outlet 36 which forms the end of the tower 2. A suitable valve (not shown) is positioned in the outlet to seal it and open it as desired. A suitable conveyor (not shown) for transporting solids is positioned beneath the particle outlet 36 to transport away coated particles falling from the particle outlet 36.

The gas outlet line 16 runs to a fan (not shown) and then on to a refrigeration plant (also not shown) where the gas is cooled down to a temperature of between 10° C. and –20° C. Any suitable refrigeration plant, for example those which are commercially available, may be used. The chilled gas leaving the refrigeration plant is recycled back to the gas inlet 32 near the bottom of the tower 2.

The particles of farinaceous material are pneumatically transported along the particle feed line 6 from a particle feed hopper (not shown). The gas for the pneumatic transportation is preferably taken from the gas leaving the tower 2 through the gas outlet line 16. The split is best positioned after the fan in the gas outlet line 16 but before any substantial refrigeration takes place. The gas used to transport the particles in the particle feed line 6 may be slightly chilled but it is not necessary to chill the gas to below 0° C.

In use, particles of farinaceous material are fed into a feed hopper connected to the particle feed line 6. For better control in the tower 2, the particles have a narrow size distribution; for example the particle sizes are in the range of about 50 μm to about 200 μm with about 70% by mass of the particles having a particle size in the range of about 80 μm to about 150 μm and with the mean particle size being about 100 μm. Air is blown along the particle feed line 6 to pull the particles into it and transport the particles to the tower 2. The air flow rate in the particle feed line is selected for easy transport of the particles. Upon reaching the tower 2, the particles enter the distributor 8 which distributes them evenly across the top of the tower 2. The particles then fall under the action of gravity down the tower 2. The air which transported the particles to the tower 2 flows around the distributor 8 and out of the gas outlet line 16. Any particles which are entrained by the gas are trapped by the filter screens 12. Clearly, however, the velocity of the air in the upper portion 4 of the tower 2 is selected such that a minimum of particles are entrained.

The particles fall in a stream into the injection portion 22 of the tower 2 which forms the particle coating zone. Here liquid fat at about 55° C. to 60° C. is sprayed into the tower 2 in the form of an aerosol. The droplet size of the fat droplets is about 5 μm to about 80 μm. The fat used is an edible, high melting point fat that has a melting point in the range of 40 to 45° C. Vegetable or animal fats may be used but the fat preferably is a hydrogenated vegetable fat such as hydrogenated palm oil fat, hydrogenated peanut oil fat, hydrogenated coconut oil fat, hydrogenated soybean oil fat, and the like. A suitable example of a fat is hydrogenated Palm Oil 44 obtained from Crocklaan. Other suitable fats are beef tallow, fractionated butter oil, and the like.

Chilled air, at a temperature in the range of –20° C. to 0° C., is blown into the tower 2 through the gas inlet 32. This chilled air rises up through the tower 2 and contacts the falling particles in a counter current manner. The upward flow of the chilled gas reduces the downward velocity of the particles and hence increases the residence time of the particles in the particle coating zone. This residence time may be varied as desired, but a residence time of about 1 minute is usually adequate. It will be appreciated that too long a residence time in the coating zone will result in particles which carry large quantities of fat and hence the particle size of the coated particles will become too large. On the other hand, too short a residence time will result in the coated particles carrying too little fat to give the desired consistency in the food product ultimately produced and insufficient cooling. The residence time in the coating zone is readily controlled by controlling the flow rate of the chilled air. In particular, the flow rate may be controlled so that particles which do not have sufficient fat coating are carried back up by the chilled air into the coating zone. Once the particles have sufficient coating and mass, they are able to fall against the flow of the chilled air.

The coated particles falling from the coating zone then fall passed the gas inlet 32 and out of the particle outlet 36. The coated particles leaving the outlet preferably have a temperature in the range of 0° C. to 10° C. and a particle size of about 200 μm to about 500 μm. Each coated particle preferably comprises about 20% to about 40% by weight of fatty material and about 80% to about 60% by weight of farinaceous material. The coated particles are then stored at a temperature of between 0° C. and 15° C. for a time sufficient for the fat to convert to the stable γ crystalline form. The coated particles obtained are substantially spherical in shape (a mixture of spheres, spheroids and related shapes) and are readily flowable. Also, the particles disperse rapidly in warm aqueous liquids. Hence the coated particles are ideally suited for use as a dispersible binding agent in dried foods.

A suitable tower 2 may be obtained from the Babcock company. However skilled process engineers would be able to readily select or design other suitable towers since the particular apparatus used is not critical to the invention. Any suitable agglomeration tower in which farinaceous particles may fall under the action of gravity and have atomised molten fat sprayed at them, and through which chilled air may be blown counter-current to the particles, may be used.

The tower 2 is suitably made of stainless steel although other suitable materials may be used.

It is also possible to perform the process in a batch agglomerator such as a fluidized bed agglomerator. Such an agglomerator would comprise a vessel having an air distribution grate at a lower end. Filters are positioned at an upper end to filter out entrained solids. Air leaving through the filters is run through a cooling system and recycled to the air distribution grate. Nozzles for the spraying of molten fat are positioned in the sides of the vessel.

In use, a batch of farinaceous particles is loaded into the agglomerator. Chilled air is introduced into the vessel through the air distribution grate to fluidize the particles. Once fluidized, the molten fat is sprayed on the particles. Depending upon the agglomerator selected, the molten fat may be sprayed into the agglomerator from above the fluidized bed of particles or from the sides of the bed. After sufficient fat has been sprayed on the particles, the spraying of the fat is terminated. The fats used, the temperature of the fat, and the droplet sizes of the fat droplets may be as described above. If necessary or desired, the introduction of the chilled air into the agglomerator may be continued for a further period of time. Thereafter the coated particles may be recovered. Suitable fluidized bed agglomerators are commercially available.

If desired, other thickening agents such as guar gum, pectin, gelatine, and the like may be added to the binding agent after production. The binding agent then may be added to dried soup mixes, dried gravy mixes, dried sauce mixes and the like.

EXAMPLES

The following non-limiting examples demonstrates the advantages of the invention.

EXAMPLE 1

A cattle food agglomerator obtained from the Babcock company, which has an internal diameter of 3 meters in the lower portion 28 of the tower 2, is used. The tower has thirty six injector nozzles 24 positioned circumferentially around the injector portion 22. Wheat flour of particle size in the range of about 50 μm to about 200 μm, with about 70% by mass of the particles having a particle size in the range of about 80 μm to about 150 μm and with the mean particle size being about 100 μm, is fed into the tower 2 at a rate of 3.6 metric tons/hour. An air flow of 2400 m³/h is used to transport the flour particles to the tower 2.

Molten hydrogenated palm oil fat (type 44 obtained from Crocklaan which has a melting point of about 45° C.) at a temperature of 55 to 60° C. is pumped at a pressure of 35 bars through the injector nozzles 24 into the tower 2. The average droplet size of the fat sprayed into the tower 2 is about 30 μm.

Chilled air, at a temperature of −20° C. is blown into the gas inlet 32 at a flow rate of 14000 m³/hour. The flour particles have a residence time in the coating zone of about 1 minute and then fall through the particle outlet 36. The coated particles leaving the tower 2 have a particle size in the range of 200 μm to about 500 μm and comprise about 36% fat by weight.

The coated particles are collected and stored at 10° C. for 72 hours. The coated particles obtained are substantially spherical and flow easily.

EXAMPLE 2

80 g of coated particles obtained from the process of example 1 and comprising 36% fat and 64% flour are added to 1 liter of boiling water while stirring. The particles dissolve rapidly, in about 20 seconds, without lumping or clumping. The resulting solution has a viscosity of 150 mPa.s at 100s$^{-1}$ and 100 mPa.s at 300s$^{-1}$ which corresponds to a sauce of average consistency. The solution also appears to be smooth and creamy.

EXAMPLE 3

An Aeromatic fluidized bed agglomerator is used. A charge of 2.25 kg of wheat flour is placed in the agglomerator on the bed grill. The wheat flour has a particle size distribution such that less than 25% by weight of the particles have a size of less than about 50 μm and less than 5% by weight have a size of greater than about 200 μm. The particles have a mean particle size of about 100 μm. Air is cycled through the agglomerator at a flow rate sufficient to fluidize the bed of wheat flour particles. The air entering the bed is at a temperature of about 6° C. Air leaving the agglomerator is chilled to about 6° C. and recycled back to the agglomerator.

A charge of 1.26 kg of molten hydrogenated palm oil fat (type 44 obtained from Crocklaan which has a melting point of about 45° C.) at a temperature of about 60° C. is pumped at a pressure of 2.5 bars through injector nozzles into the agglomerator. The droplet size of the fat sprayed into the agglomerator is about 30 μm. The fat is sprayed into the agglomerator over a time of about 15 minutes.

After the spraying of the fat has terminated, cycling of the chilled air through the agglomerator continues for another 3 to 6 minutes. The cycling of the chilled air is then terminated and the coated particles are collected from the agglomerator. The coated particles have a particle size in the range of 200 μm to about 500 μm and comprise about 36% fat by weight. The coated particles are stored at 4° C. for 24 hours. The coated particles obtained are substantially spherical and flow easily.

80 g of the coated particles are added to 1 liter of boiling water while stirring. The particles dissolve rapidly, in about 20 seconds, without lumping or clumping. The resulting solution has a viscosity which corresponds to a sauce of average consistency. The solution also appears to be smooth and creamy.

EXAMPLE 4

The process of example 3 is repeated except that 0.75 kg of molten hydrogenated palm oil fat is sprayed on the wheat particles. The coated particles obtained have a particle size in the range of 200 μm to about 500 μm, are substantially spherical and flow easily, and comprise about 25% fat by weight.

What is claimed is:

1. A process for producing a binding agent for foodstuffs, the process comprising:

introducing a chilled gas selected from the group consisting of carbon dioxide, nitrogen, and air at a temperature below 10° C. upwardly into an enclosed particle coating zone to chill particles of farinaceous material transported in the enclosed particle coating zone, wherein less than 25% by weight of the particles of farinaceous material have a particle size of less than 50 μm and less than 5% by weight of the particles have a size greater than 200 μm;

spraying a molten, edible fat having a melting point above 35° C. into the particle coating zone in the form of droplets of a size less than about 80 μm to coat the particles of farinaceous material and provide coated particles comprising about 60% to about 85% by weight of farinaceous material and about 40% to about 15% by weight of edible fat, the chilled gas cooling the edible fat which coats the coated particles to a temperature below the melting point of the edible fat; and collecting the coated particles.

2. A process according to claim 1 in which the particles of farinaceous material fall through the enclosed particle coating zone against the flow of the chilled gas.

3. A process according to claim 2 in which the particles of farinaceous material have a residence time in the enclosed particle coating zone of less than about 5 minutes.

4. A process according to claim 1 in which the particles of farinaceous material are fluidized in the particle coating zone by the flow of the chilled gas.

5. A process according to claim 4 in which the particles of farinaceous material have a residence time in the particle coating zone during spraying of the edible fat of about 10 minutes to about 20 minutes.

6. A process according to claim 1, wherein the coated particles contain about 20% to about 40% by weight of fat and about 80% to about 60% by weight of farinaceous material.

7. A process according to claim 1, wherein at least 60% by weight of the coated particles have a particle size within about 60 μm of the mean size of said coated particles.

8. A process according to claim 1, in which the droplets of molten edible fat have a droplet size range of about 5 μm to about 80 μm.

* * * * *